(12) United States Patent
Yang et al.

(10) Patent No.: US 9,349,346 B2
(45) Date of Patent: May 24, 2016

(54) DISPLAY APPARATUS AND METHOD AND COLOR TEMPERATURE COMPENSATION APPARATUS THEREOF

(71) Applicant: Novatek Microelectronics Corp., Hsinchu (TW)

(72) Inventors: Chih-Yuan Yang, Hsinchu County (TW); Yu-Hsing Chuang, Hsinchu (TW); Feng-Ting Pai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 130 days.

(21) Appl. No.: 14/287,060

(22) Filed: May 26, 2014

(65) Prior Publication Data

US 2015/0340008 A1 Nov. 26, 2015

(51) Int. Cl.
*G09G 5/06* (2006.01)
*G09G 5/10* (2006.01)
*G06T 7/40* (2006.01)
*H04N 5/57* (2006.01)
*H04N 1/60* (2006.01)

(52) U.S. Cl.
CPC .. *G09G 5/06* (2013.01); *G09G 5/10* (2013.01); *H04N 1/60* (2013.01); *G09G 2320/0242* (2013.01); *G09G 2320/0666* (2013.01); *G09G 2360/144* (2013.01)

(58) Field of Classification Search
CPC combination set(s) only.
See application file for complete search history.

(56) References Cited

U.S. PATENT DOCUMENTS

| | | | |
|---|---|---|---|
| 2004/0036899 A1* | 2/2004 | Takano | H04N 1/4072 358/1.9 |
| 2007/0177815 A1* | 8/2007 | Yang | B60R 1/00 382/254 |
| 2011/0096084 A1* | 4/2011 | Hu | G09G 3/3413 345/589 |
| 2012/0050340 A1* | 3/2012 | Liao | G09G 3/2003 345/690 |

* cited by examiner

*Primary Examiner* — Wesner Sajous
(74) *Attorney, Agent, or Firm* — Jianq Chyun IP Office

(57) ABSTRACT

A color temperature compensation apparatus includes a compensation table and a controller. The compensation table records a relationship between a plurality of compensation values and each of a plurality of gray-levels, wherein the relationship is established based on a plurality of color temperature compensation curves. The controller is coupled to the compensation table, and generates a plurality of compensation values by referring to the compensation table according to a gray-level of each of a plurality of image data and a reference color temperature. The controller further calculates each of a plurality of compensated image data according to the compensation values, wherein the color temperature compensation curves respectively correspond to a plurality of color temperatures.

25 Claims, 4 Drawing Sheets

DISPLAY APPARATUS AND METHOD AND COLOR TEMPERATURE COMPENSATION APPARATUS THEREOF

BACKGROUND OF THE INVENTION

1. Field of the Invention

The present invention generally relates to a color compensation technology, in particular, to a color temperature compensation apparatus and method for a display apparatus.

2. Description of Related Art

The colors of display panel are highly affected by the ambient light. A warm ambient light is considered with more red and less blue compared to a cool ambient light. A warm ambient light may be an incandescent light, such as using a tungsten filament (about 3000K). A cooler ambient light is a fluorescent light (about 4500K). Overhead-sun daylight, cloudy daylight, and shady daylight produce progressively cooler light (5000-11000K). The ambient light tends to dominate the color temperature.

The display panels are manually controllable to select the type of existing ambient light. As a result of the selection, a particular compensation algorithm is performed on the color pixels to compensate for the color bias created by the ambient light so that the image on the display panel is truer. However, these display panels need manual control, only provide limited color temperature transform curve or color temperature look up table, and may not perform a smooth transform process according to the ambient light. What is needed in the field is a system that works well in conjunction with smooth color compensations algorithms to produce an image of the display panel with truer colors automatically.

SUMMARY OF THE INVENTION

Accordingly, the present invention is directed to detect the type of ambient light by an ambient color temperature sensor, and automatically compensate the color temperature by a controller. As a result, the temperature compensation apparatus applies the appropriate color compensation values to correct any color bias due to the detected ambient light.

The present invention provides a color temperature compensation apparatus including a compensation table and a controller. The compensation table records a relationship between a plurality of compensation values and each of a plurality of gray-levels, wherein the relationship is established based on a plurality of color temperature compensation curves. The controller is coupled to the compensation table, and generates a plurality of compensation values by referring to the compensation table according to a gray-level of each of a plurality of image data and a reference color temperature. The controller further calculates each of a plurality of compensated image data according to the compensation values, wherein the color temperature compensation curves respectively correspond to a plurality of color temperatures.

The present invention also provides a display apparatus. The display apparatus includes a display panel and a color temperature compensation apparatus. The color temperature compensation apparatus is coupled to the display panel, and the color temperature compensation apparatus includes a compensation table and a controller. The compensation table records a relationship between a plurality of compensation values and each of a plurality of gray-levels, wherein the relationship is established based on a plurality of color temperature compensation curves. The controller is coupled to the compensation table. The controller receives a reference color temperature and generates a plurality of compensation values by referring to the compensation table according to a gray-level of each of a plurality of image data and the reference color temperature. The controller further calculates each of a plurality of compensated image data according to the compensation values, wherein, the color temperature compensation curves respectively correspond to a plurality of color temperatures, and the compensated image data are provided to the display panel.

The present invention further provides a color temperature compensation method. Steps of the color temperature compensation method include: receiving a reference color temperature; providing a compensation table for recording a relationship between a plurality of compensation values and each of a plurality of gray-levels, wherein, the relationship is established based on a plurality of color temperature compensation curves; generating a plurality of compensation values by referring to the compensation table according to a gray-level of each of a plurality of image data and the reference color temperature; and calculating each of a plurality of compensated image data according to the compensation values, wherein, the color temperature compensation curves respectively correspond to a plurality of color temperatures.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
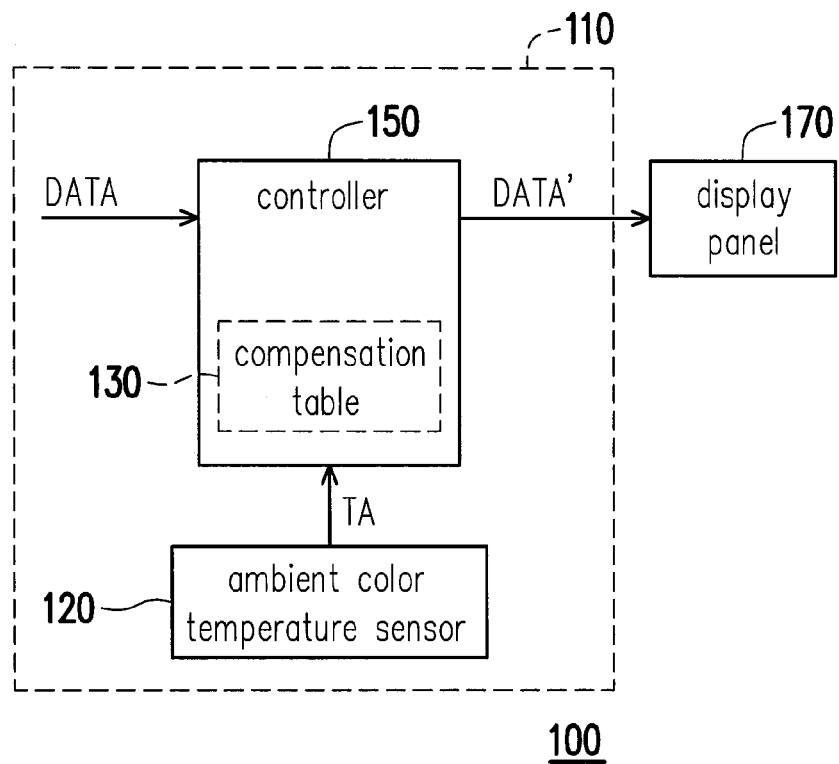
FIG. 1 shows a block configuration diagram illustrating a display apparatus according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a block configuration diagram illustrating a display apparatus 110 according to an exemplary embodiment of the invention. The display apparatus 100 includes a color temperature compensation apparatus 110 and a display panel 170. The color temperature compensation apparatus 110 is used to compensate a color temperature of image data, and generates and provides a compensated image data to the display panel 170 for display. In this embodiment, the color temperature compensation apparatus 110 includes an ambient color temperature sensor 120, a compensation table 130 and a controller 150. The ambient color temperature sensor 120 may measure an ambient color temperature TA of an ambient light. Moreover, the ambient color temperature sensor 120 may provide the ambient color temperature TA to the controller 150, and the ambient color temperature TA may be a reference color temperature.

Figure 2:
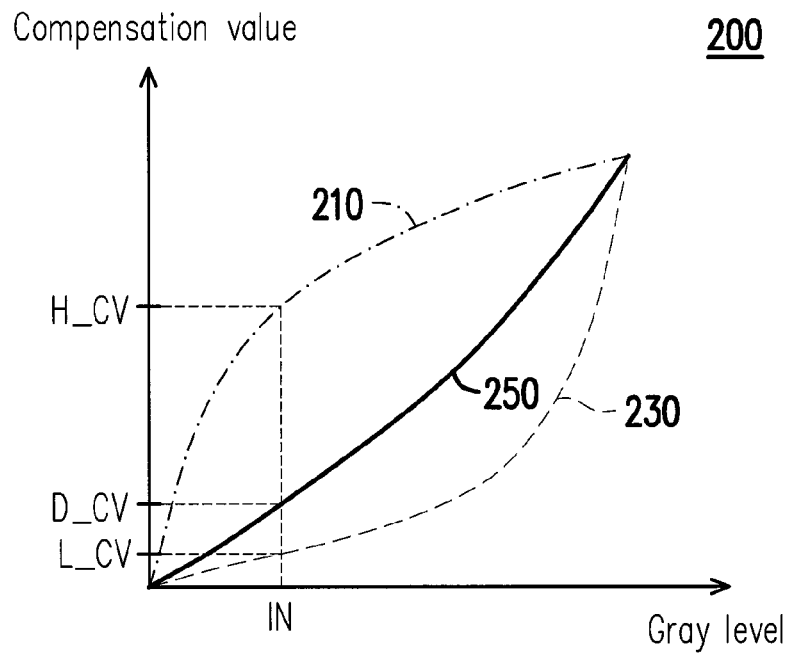
FIG. 2 shows a schematic diagram illustrating color temperature compensation curves of a compensation table according to an exemplary embodiment of the invention.

On the other hand, the compensation table 200 may record a relationship between a plurality of compensation values and each of a plurality of gray-levels, wherein the relationship is established based on a plurality of color temperature compensation curves. In detail, please refer to FIG. 2, FIG. 2 shows the color temperature compensation curves according to an exemplary embodiment of the invention. A first color temperature compensation curve 210, a default color temperature compensation curve 230, and a second color temperature compensation curve 250 are illustrated in FIG. 2. The first color temperature compensation curve 210 corresponds to a first color temperature, the default color temperature compensation curve 230 corresponds to a default color temperature, and the second color temperature compensation curve 250 corresponds to a second color temperature. The first color temperature is the highest color temperature related to the default and second color temperature, and the second color temperature is the lowest color temperature related to the default and first color temperature.

Please noted here, the first color temperature compensation curve 210 is a maximum color temperature compensation curve, and the second color temperature compensation curve 250 is a minimum color temperature compensation curve. That is, for each gray level of an image data, the first, default and second color temperature compensation curves 210, 230 and 250 respectively corresponds to a first, default, and second compensation values, wherein, the first compensation value is larger than the default compensation value, and the default compensation value is larger than the second compensation value. For example, three compensation values H_CV, D_CV and L_CV are corresponding to a gray level IN according to the first, default and second color temperature compensation curves 210, 230 and 250, respectively.

The first, default and second color temperature compensation curves 210, 230 and 250 may be preset by a designer. The designer may preset the first, default and second color temperature compensation curves 210, 230 and 250 according to the characteristics of the display panel 170 and necessary of users. The relationships between the compensation values and the gray levels according to the first, default and second color temperature compensation curves 210, 230 and 250 may be recorded in the compensation table 200. In some embodiment, the compensation table 300 may be a storage unit (may be a memory) and the relationships between the compensation values and the gray levels according to the first, default and second color temperature compensation curves 210, 230 and 250 may be digitized and be saved in the storage unit to form a look up table. The compensation table 200 may also be a processor and used to calculate the first, default, and second compensation values corresponding to the gray level according to the first, default and second color temperature compensation curves 210, 230 and 250.

In addition, the compensation table 130 may be embedded in the controller 150 or disposed out of the controller 150 and being coupled to the controller 150.

Referring to FIG. 1, the controller 150 may be coupled to the ambient color temperature sensor 120 for receiving the ambient color temperature TA. Next, the controller 150 may receive the ambient color temperature TA to be the reference color temperature RCT, and compare the reference color temperature RCT (i.e., the ambient color temperature TA) with the default color temperature for generating a comparison result. The controller 150 may select one of the first and second color temperature compensation curves 210 and 250 to be the selected color temperature compensation curve by the comparison result. In detail, when the reference color temperature is larger than the default color temperature, the first color temperature compensation curve 210 is selected by the controller 150. On the contrary, when the reference color temperature is lower than the default color temperature, the second color temperature compensation curve 250 is selected by the controller 150. A selected color temperature is corresponding to the selected color temperature compensation curve. Besides, the controller 150 further obtains a compensation ratio according to the default color temperature, the selected color temperature, and the reference color temperature.

For example, when the reference color temperature is larger than the default color temperature, the controller 150 may select the first color temperature compensation curve 210 to be the selected color temperature compensation curve. That is, the selected color temperature is the first color temperature corresponding to the first color temperature compensation curve 210. The controller 150 obtains a compensation ratio H_Ratio according to the first color temperature FCT, the default color temperature DCT and the reference color temperature RCT, wherein the compensation ratio H_Ratio=(RCT−DCT)/(FCT−DCT) (equation 1).

In this embodiment, the compensation table 200 may be implemented by the compensation values. The controller 150 receives image data with a gray level IN, and the controller 150 obtains the first compensation value H_CV, the default compensation value D_CV, and the second compensation value L_CV by reference to the first color temperature compensation curve 210, the default color temperature compensation curve 250, and the second color temperature compensation curve 230, respectively. The gray level IN includes a red part R_IN, a green part G_IN, and blue part B_IN. A compensated red part gray level CR_IN may equal to L_CV+(D_CV−L_CV)*H_Ratio (equation 2). A compensated green part gray level CG_IN may equal to the default compensation value D_CV. A compensated blue part gray level CB_IN may equal to D_CV+(H_CV−D_CV)*H_Ratio (equation 3).

When the reference color temperature is smaller than the default color temperature, the controller 150 may select the second color temperature compensation curve 250 to be the selected color temperature compensation curve. That is, the selected color temperature is the second color temperature corresponding to the second color temperature compensation curve 250. The controller 150 obtains a compensation ratio L_Ratio according to the second color temperature SCT, the default color temperature DCT and the reference color temperature RCT, wherein the compensation ratio L_Ratio=(RCT−SCT)/(DCT−SCT). (equation 4)

The controller 150 receives image data with a gray level IN, and the controller 150 obtains the first compensation value H_CV, the default compensation value D_CV, and the second compensation value L_CV by reference to the first color temperature compensation curve 210, the default color temperature compensation curve 250, and the second color temperature compensation curve 230, respectively. The gray level IN includes a red part R_IN, a green part G_IN, and blue part B_IN. A compensated red part gray level CR_IN may equal to D_CV+(H_CV−D_CV)*L_Ratio (equation 5). A compensated green part gray level CG_IN may equal to D_CV. A compensated blue part gray level CR_IN may equal to L_CV+(D_CV−L_CV)*L_Ratio (equation 6).

On the other hand, in some embodiments, the compensation values may respectively be a plurality of gain values. In detail, when the reference color temperature is larger than the default color temperature, the controller 150 receives image data with a gray level IN, and the controller 150 obtains the first gain value H_CV, the default gain value D_CV, and the second gain value L_CV by reference to the first color temperature compensation curve 210, the default color temperature compensation curve 250, and the second color temperature compensation curve 230, respectively. The gray level IN includes a red part R_IN, a green part G_IN, and blue part B_IN. A compensated red part gray level CR_IN may equal to R_IN*[L_CV+(D_CV−L_CV)*H_Ratio] (equation 7). A compensated green part gray level CG_IN may equal to G_IN*D_CV (equation 8). A compensated blue part gray level CB_IN may equal to B_IN*[D_CV+(H_CV−D_CV)*H_Ratio] (equation 9).

Besides, when the reference color temperature is smaller than the default color temperature, the controller 150 receives image data with a gray level IN, and the controller 150 obtains the first gain value H_CV, the default gain value D_CV, and the second gain value L_CV by reference to the first color temperature compensation curve 210, the default color temperature compensation curve 250, and the second color temperature compensation curve 230, respectively. The gray level IN includes a red part R_IN, a green part G_IN, and blue part B_IN. A compensated red part gray level CR_IN may equal to R_IN*[D_CV+(H_CV−D_CV)*L_Ratio] (equation 10). A compensated green part gray level CG_IN may equal to G_IN*D_CV (equation 11). A compensated blue part gray level CB_IN may equal to B_IN*[L_CV+(D_CV−L_CV)*L_Ratio] (equation 12).

Thus, the compensated image data DATA' is generated by the controller 150 from performing a smooth transform process to correct any color bias due to the detected ambient light. Therefore, the compensated image data DATA' may be provided to the display panel 170, for example, a LCD monitor, touch-screen, the present invention is not limited thereto.

Figure 3:
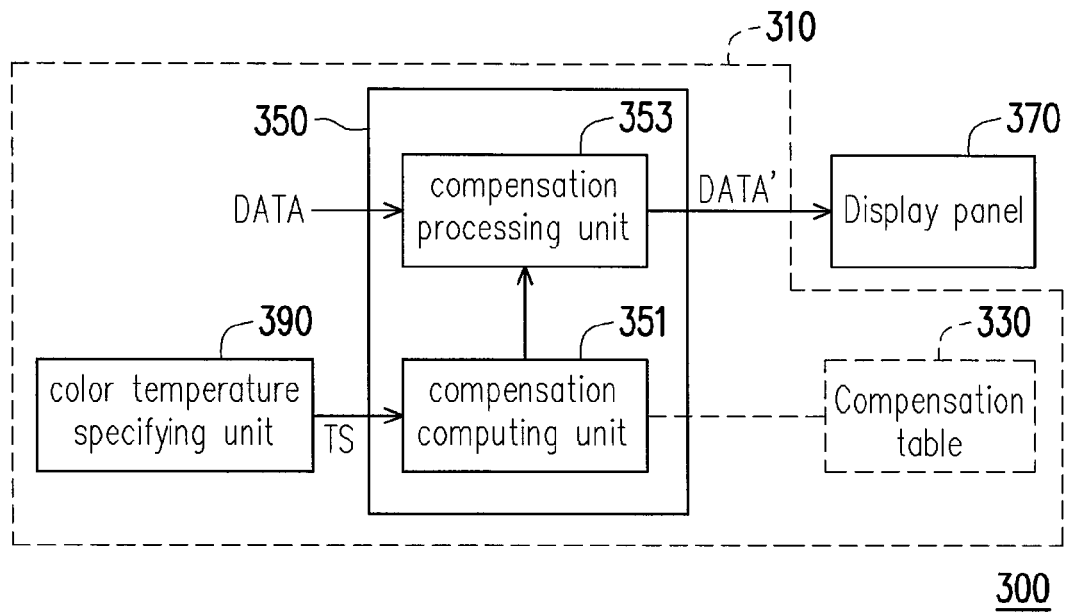
FIG. 3 shows a block configuration diagram illustrating a display apparatus according to another exemplary embodiment of the invention.

FIG. 3 shows a block diagram illustrating a display apparatus 300 according to another exemplary embodiment of the invention. Referring to FIG. 1 and FIG. 3, except for a controller 350 and a color temperature specifying unit 390, the display apparatus 300 may be substantially the same as display apparatus 100. The display apparatus 300 may include a color temperature compensation apparatus 310 and a display panel 370, wherein the color temperature compensation apparatus 310 may include a compensation table 330, a controller 350, and a color temperature specifying unit 390. The compensation table 330 may record a relationship between a plurality of compensation values and each of a plurality of gray-levels, wherein the relationship is established based on a plurality of color temperature compensation curves. The compensation table 330 may be built in the controller 350 or stored in, for example, a storage device such as a memory, and coupled to the controller 350.

In some cases, the display apparatus 300 may be controllable to select a circumstance of display. The color temperature specifying unit 390 may generate specified color temperature according to the selected circumstance. The color temperature specifying unit 390 may be coupled to the controller 350 to transmit the specified color temperature TS. The compensation computing unit 351 may receive the specified color temperature TS from the color temperature specifying unit 390.

The compensation table 330 may be built in the controller 350 or stored in, for example, a storage device such as a memory, and coupled to the compensation computing unit 351. The controller 350 may receive the specified color temperature TS to be the reference color temperature RCT, and compare the reference color temperature RCT (i.e., the specified color temperature TS) with the default color temperature for generating a comparison result.

In detail, the controller 350 may include a compensation computing unit 351 and a compensation processing unit 353. The compensation computing unit 351 may be coupled to the color temperature specifying unit 390 for comparing the specified color temperature TS with the default color temperature DCT, so as to generate a comparison result. According to equations (1) and (4), the compensation computing unit 351 may generate a compensation ratio L_Ratio when the reference color temperature is smaller than the default color temperature, and generate a compensation ratio H_Ratio when the reference color temperature is larger than the default color temperature. The compensation computing unit 351 may compute the compensation values or compensation gain values of the image data according to the gray-level of the image data DATA and equations (3)-(6) when the compensation table 330 is implemented by the compensation values. Thus, the compensated values are generated by compensation computing unit 351 from performing a smooth transform process to correct any color bias due to the detected ambient light.

The compensation processing unit 353 may be coupled to the compensation computing unit 351 for receiving the image data and the compensated values. The compensation processing unit 353 may directly generate the compensated image data DATA' to the display panel 370.

On the other hand, when the compensation values are gain values, the compensation processing unit 353 may generate the compensated image data DATA', which equal to IN*compensation gain values, for each part of red part R_IN, green part G_IN, and blue part B_IN to the display panel 370, wherein compensation gain values are obtained by equations (3)-(6).

Thus, the compensated image data DATA' is generated by the controller 350 from performing a smooth transform process to correct any color bias. Therefore, the compensated image data DATA' may be provided to a display panel 370, for example, a LCD monitor, touch-screen, the present invention is not limited thereto.

Figure 4:
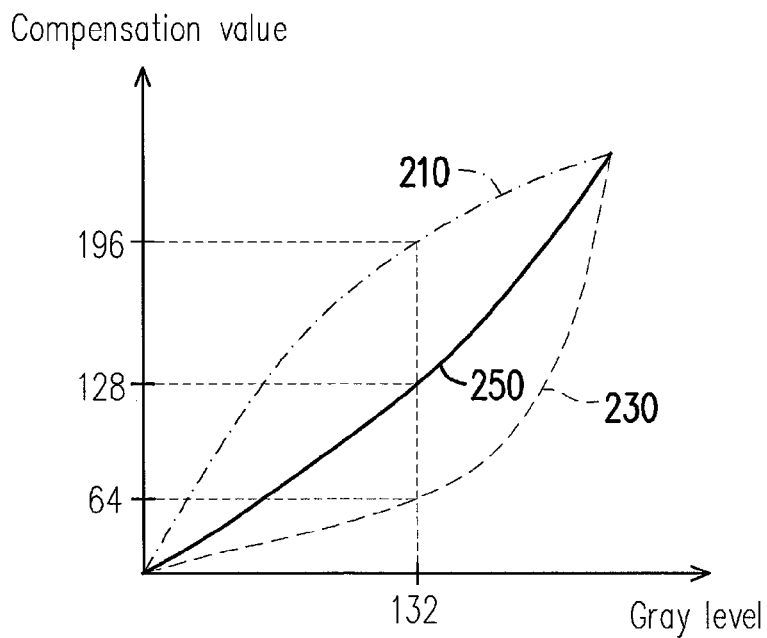
FIG. 4 shows a schematic diagram illustrating the compensation table implemented by the compensation values according to an exemplary embodiment of the invention.

Referring to FIG. 4, FIG. 4 shows a schematic diagram illustrating the compensation table implemented by the compensation values according to an exemplary embodiment of the invention. In the present embodiment, the first color temperature FCT is assumed to be 11000K, the second color temperature SCT is assumed to be 3000K, the default color temperature DCT is assumed to be 6500K, and the reference color temperature RCT (i.e., ambient color temperature TA) is assumed to be 9000K. Take the display panel 370 which using three parts of colors, red (R), green (G), blue (B), of color mixing for an example. The compensation apparatus may apply to the display panel 370 which using four colors or more colors, for example, red (R), green (G), blue (B) and yellow (Y), the present invention is not limited thereto. The gray-level of red, green, and blue (R_IN, G_IN, B_IN) is assumed to be (132, 132, 132). According to the gray-level of 132, the first compensation value H_CV, the default compensation value D_CV and the second compensation value L_CV are chosen to be 196, 128, and 64, respectively, from the compensation table implemented by the compensation values.

In this case, RCT−DCT=3500>0, the compensation computing unit 351 may obtain the compensation ratio H_Ratio by equation (1).

$$H\_Ratio=(RCT-DCT)/(SCT-DCT)=(9000-6500)/(10000-6500)=0.7142$$

The compensation computing unit 351 may generate the compensated image data DATA' according to the compensation ratio H_Ratio, the default compensation value D_CV (i.e., 128), the first compensation value H_CV (i.e., 196), and the second compensation value L_CV (i.e., 64) by equation (2) and (3).

A compensated red part gray level CR_IN=L_CV+(D_CV−L_CV)*H_Ratio=64+(128−64)*H_Ratio=109.7088. A compensated green part gray level CG_IN=D_CV=128. A compensated blue part gray level CB_IN=D_CV+(H_CV−D_CV)*H_Ratio=128+(196−128)*R=176.5656.

Figure 5:
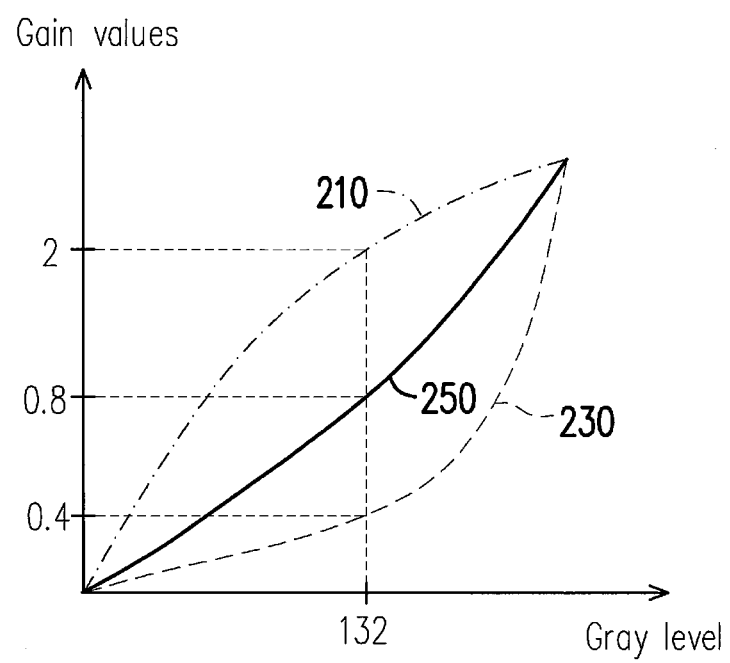
FIG. 5 shows a schematic diagram illustrating the compensation table implemented by the gain values according to another exemplary embodiment of the invention.

Referring to FIG. 5, FIG. 5 shows a schematic diagram illustrating the compensation table implemented by the gain values according to another exemplary embodiment of the invention. In this case, the first color temperature FCT is assumed to be 11000K, the second color temperature SCT is assumed to be 3000K, the default color temperature DCT is assumed to be 6500K, and the reference color temperature RCT (i.e., the specified color temperature TS) is assumed to be 5000K.

The gray levels of red, green, and blue parts of the image data (R_IN, G_IN, B_IN) are assumed to be (132, 132, 132). According to the gray-level of 132, the first compensation value H_CV, the default compensation value D_CV and the second compensation value L_CV are chosen to be 2, 0.8, and 0.4, respectively, and the compensation values 2, 0.8, and 0.4 are gain values.

In this case, RCT−DCT=−1500<0, the compensation computing unit 351 may obtain the compensation ratio L_Ratio by equation (4).

$$L\_Ratio=(RCT-SCT)/(DCT-SCT)=(5000-3000)/(6500-3000)=0.5714$$

The compensation computing unit 351 may generate the compensated image data DATA' according to the compensation ratio L_Ratio, the default compensation value D_CV (i.e., 0.8), the first compensation value H_CV (i.e., 2), and the second compensation value L_CV (i.e., 0.4) by equation (5)-(6).

It should be noted that the compensation values in the compensation table are the gain values. Therefore, a compensation gain value of red part gray level CR_IN=D_CV+(H_CV−D_CV)*L_Ratio=0.8+(2−0.8)*L_Ratio=1.4857. A compensated gain value of green part gray level CG_IN=D_CV=0.8. A compensated gain value of blue part gray level CB_IN=L_CV+(D_CV−L_CV)*L_Ratio=0.4+(0.8−0.4)*L_Ratio=176.5656.

Next, the compensation processing unit 353 may generate the compensated image data DATA' by multiplying the gray-level of the image data and the compensation gain values. Therefore, a compensated red part gray level CR_IN=132*1.4857=196.1124. A compensated green part gray level CG_IN=132*0.8=105.6. A compensated blue part gray level CB_IN=132*0.62856=82.96992.

Figure 6:
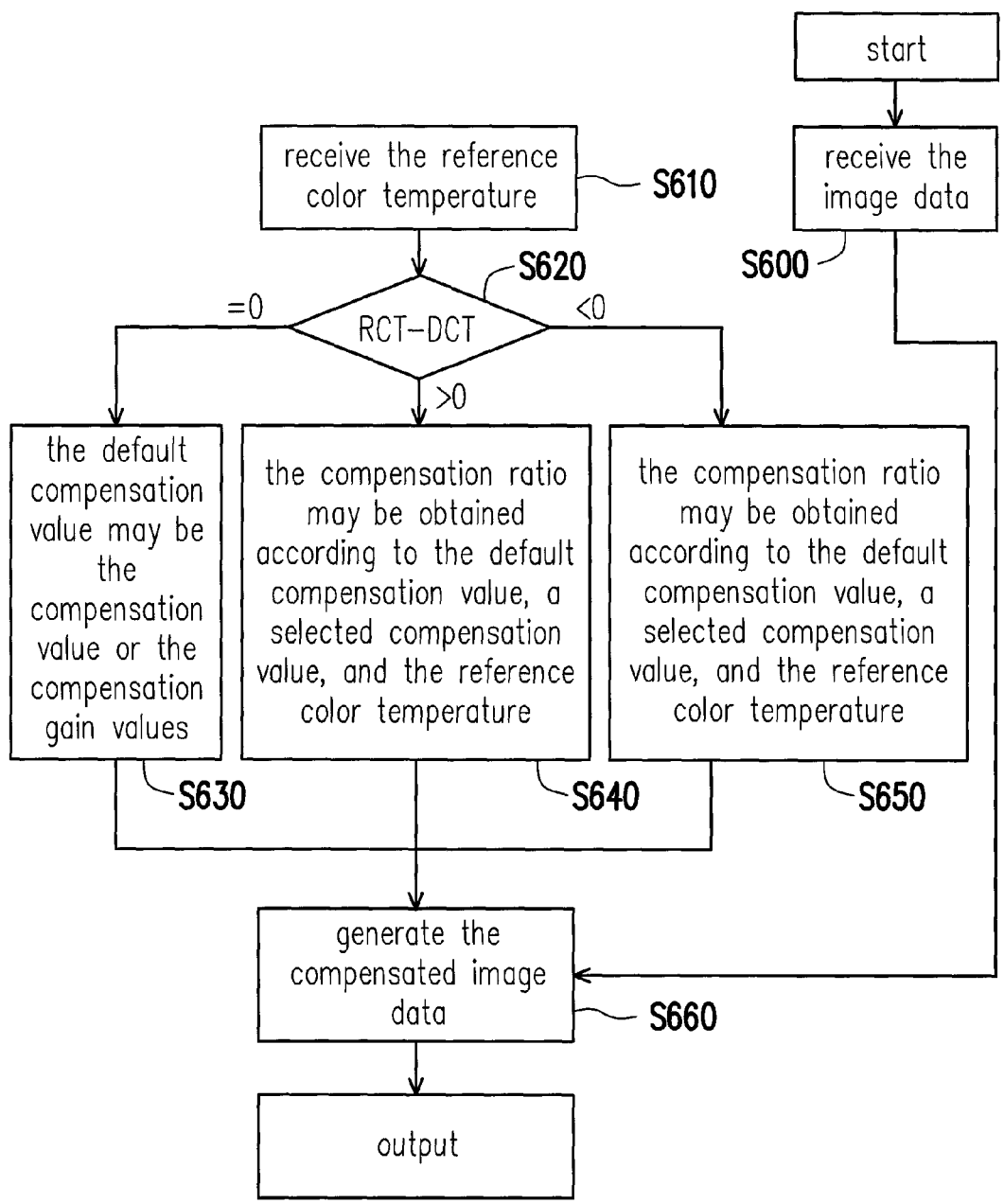
FIG. 6 shows a flowchart illustrating a color temperature compensation method according to an exemplary embodiment of the invention.

FIG. 6 shows a flowchart illustrating a color temperature compensation method according to an exemplary embodiment of the invention. A color temperature specifying unit or the ambient color temperature sensor may be used to transmit a reference color temperature for color temperature compensation operation.

The image data may be received at 5600. The reference color temperature RCT may be received at 5610. Accordingly, the reference color temperature RCT may be compared with the default color temperature DCT by RCT−DCT at 5620. If RCT−DCT=0, the default compensation value D_CV may be the compensation value or the compensation gain values at 5630.

If RCT−DCT>0, the compensation ratio H_Ratio may be obtained according to the default compensation value D_CV, a selected compensation value H_CV, and the reference color temperature RCT at 5640. On the contrary, if RCT−DCT<0, the compensation ratio L_Ratio may be obtained according to the default compensation value D_CV, a selected compensation value L_CV, and the reference color temperature RCT at 5650. The compensated image data DATA' may be generated at 5660.

To sum up, the embodiments of the present invention provide a color temperature compensation apparatus and method for a display apparatus. The present invention is directed to detect the type of ambient light by an ambient color temperature sensor, and automatically compensate the color temperature by a controller. As a result, the temperature compensation apparatus applies the appropriate color compensation values by performing a smooth transform process to correct any color bias due to the detected ambient light.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color temperature compensation apparatus comprising:
   a compensation table, recording a relationship between a plurality of compensation values and each of a plurality of gray-levels, wherein the relationship is established based on a plurality of color temperature compensation curves; and
   a controller coupled to the compensation table, generating a plurality of compensation values by referring to the compensation table according to a gray-level of each of a plurality of image data and a reference color temperature, and calculating each of a plurality of compensated image data according to the compensation values,
   wherein, the color temperature compensation curves respectively correspond to a plurality of color temperatures.

2. The color temperature compensation apparatus according to claim 1, wherein the color temperature compensation curves comprises a first color temperature compensation curve, a second color temperature compensation curve and a default color temperature compensation curve, and the first color temperature compensation curve, the second color temperature compensation curve and the default color temperature compensation curve respectively correspond to a first color temperature, a second color temperature and a default color temperature,
   wherein, the first color temperature is larger than the default color temperature, and the default color temperature is larger than the second color temperature.

3. The color temperature compensation apparatus according to claim 2, wherein, each of the gray levels corresponds to a first compensation value, a default compensation value and a second compensation value according to the first color temperature compensation curve, the default color temperature compensation curve and the second color temperature compensation curve respectively, wherein, the first compensation value is not less than the default compensation value, and the default compensation value is not less than the second compensation value.

4. The color temperature compensation apparatus according to claim 2, wherein the controller comprises:
a compensation computing unit receiving the reference color temperature and comparing the reference color temperature with the default color temperature to generate a comparison result, wherein, the compensation computing unit generates a compensation ratio by referring to two of the color temperature compensation curves and the gray-level of the image data according to the comparison result; and
a compensation processing unit coupled to the compensation computing unit, receiving the image data and the compensation ratio, and generating the compensated image data according to the compensation ratio.

5. The color temperature compensation apparatus according to claim 4, wherein the compensation computing unit obtains the compensation ratio according to the default color temperature, a selected color temperature, and the reference color temperature,
wherein, the selected color temperature is one of the first and second color temperatures which is selected according to the comparison result.

6. The color temperature compensation apparatus according to claim 5, wherein when the reference color temperature is larger than the default color temperature, a selected color temperature compensation curve is the first color temperature compensation curve, and when the reference color temperature is smaller than the default color temperature, the selected color temperature compensation curve is the second color temperature compensation curve,
wherein, the selected color temperature is corresponding to the selected color temperature compensation curve.

7. The color temperature compensation apparatus according to claim 4, wherein the compensation processing unit generates the compensated image data according to the gray-level of the image data, the compensation ratio, a first compensation value, a second compensation value and the default compensation value,
wherein, the first and second compensation values are respectively obtained by referring to the first and second color temperature compensation curves.

8. The color temperature compensation apparatus according to claim 1, further comprising:
an ambient color temperature sensor, coupled to the controller, wherein the ambient color temperature sensor measures an ambient color temperature of an ambient light for generating the reference color temperature.

9. The color temperature compensation apparatus according to claim 1, further comprising:
a color temperature specifying unit, coupled to the controller, wherein the color temperature specifying unit receives a specified color temperature and transports the specified color temperature to the controller to be the reference color temperature.

10. A display apparatus, comprising:
a display panel;
a color temperature compensation apparatus, coupled to the display panel, comprising:
a compensation table, recording a relationship between a plurality of compensation values and each of a plurality of gray-levels, wherein the relationship is established based on a plurality of color temperature compensation curves; and
a controller coupled to the compensation table, generating a plurality of compensation values by referring to the compensation table according to a gray-level of each of a plurality of image data and a reference color temperature, and calculating each of a plurality of compensated image data according to the compensation values,
wherein, the color temperature compensation curves respectively correspond to a plurality of color temperatures, and the compensated image data are provided to the display panel.

11. The display apparatus according to claim 10, wherein the color temperature compensation curves comprises a first color temperature compensation curve, a second color temperature compensation curve and a default color temperature compensation curve, and the first color temperature compensation curve, the second color temperature compensation curve and the default color temperature compensation curve respectively correspond to a first color temperature, a second color temperature and a default color temperature,
wherein, the first color temperature is larger than the default color temperature, and the default color temperature is larger than the second color temperature.

12. The display apparatus according to claim 11, wherein, each of the gray levels corresponds to a first compensation value, a default compensation value and a second compensation value according to the first color temperature compensation curve, the default color temperature compensation curve and the second color temperature compensation curve respectively,
wherein, the first compensation value is not less than the default compensation value, and the default compensation value is not less than the second compensation value.

13. The display apparatus according to claim 11, wherein the controller comprises:
a compensation computing unit receiving the reference color temperature and, comparing the reference color temperature with the default color temperature to generate a comparison result, wherein, the compensation computing unit generates a compensation ratio by referring to two of the color temperature compensation curves and the gray-level of the image data according to the comparison result; and
a compensation processing unit coupled to the compensation computing unit, receiving the image data and the compensation ratio, and generating the compensated image data according to the compensation ratio.

14. The display apparatus according to claim 13, wherein the compensation computing unit obtains the compensation ratio according to the default color temperature, a selected color temperature, and the reference color temperature,
wherein, the selected color temperature is one of the first and second color temperatures which is selected according to the comparison result.

15. The display apparatus according to claim 14, wherein when the reference color temperature is larger than the default color temperature, a selected color temperature compensation curve is the first color temperature compensation curve, and when the reference color temperature is smaller than the default color temperature, the selected color temperature compensation curve is the second color temperature compensation curve,
wherein, the selected color temperature corresponds to the selected color temperature compensation curve.

16. The display apparatus according to claim 13, wherein the compensation processing unit generates the compensated image data according to the compensation ratio, the gray-level of the image data, a first compensation value, a second compensation value and the default compensation value, wherein, the first and second compensation values are respectively obtained by referring to the first and second color temperature compensation curves.

17. The display apparatus according to claim 10, wherein the color temperature compensation apparatus further comprises:

an ambient color temperature sensor, coupled to the controller, wherein the ambient color temperature sensor measures an ambient color temperature of an ambient light for generating the reference color temperature.

18. A color temperature compensation method, comprising:

receiving a reference color temperature by a controller;

providing a compensation table by a processor for recording a relationship between a plurality of compensation values and each of a plurality of gray-levels, wherein, the relationship is established based on a plurality of color temperature compensation curves; and generating a plurality of compensation values by the controller by referring to the compensation table according to a gray-level of each of a plurality of image data and the reference color temperature, and calculating each of a plurality of compensated image data according to the compensation values, wherein, the color temperature compensation curves respectively correspond to a plurality of color temperatures.

19. The color temperature compensation method according to claim 18, wherein the color temperature compensation curves comprises a first color temperature compensation curve, a second color temperature compensation curve and a default color temperature compensation curve, and the first color temperature compensation curve, the second color temperature compensation curve and the default color temperature compensation curve respectively correspond to a first color temperature, a default color temperature and a second color temperature, wherein, the first color temperature is larger than the default color temperature, and the default color temperature is larger than the second color temperature.

20. The color temperature compensation method according to claim 18, wherein each of the gray levels corresponds to a first compensation value, a default compensation value and a second compensation value according to the first color temperature compensation curve, the default color temperature compensation curve and the second color temperature compensation curve respectively, wherein, the first compensation value is not less than the default compensation value, and the default compensation value is not less than the second compensation value.

21. The color temperature compensation method according to claim 18, wherein steps of generating the compensation values by referring to the compensation table according to the gray-level of each of the image data and the reference color temperature, and calculating each of a plurality of compensated image data according to the compensation values comprises:

comparing the reference color temperature with the default color temperature to generate a comparison result;

generates a compensation ratio by referring to two of the color temperature compensation curves and the gray-level of the image data according to the comparison result; and generating the compensated image data according to the compensation ratio.

22. The color temperature compensation method according to claim 21, wherein the compensation ratio is obtained according to the default color temperature, a selected color temperature, and the reference color temperature, wherein, the selected color temperature is one of the first and second color temperatures which is selected according to the comparison result.

23. The color temperature compensation method according to claim 22, wherein when the reference color temperature is larger than the default color temperature, a selected color temperature compensation curve is the first color temperature compensation curve, and when the reference color temperature is smaller than the default color temperature, the selected color temperature compensation curve is the second color temperature compensation curve, wherein, the selected color temperature corresponds to the selected color temperature compensation curve.

24. The color temperature compensation method according to claim 21, wherein the compensated image data is generated according to the compensation ratio, the gray-level of the image data, a first compensation value, a second compensation value and the default compensation value, wherein, the first and second compensation values are respectively obtained by referring to the first and second color temperature compensation curves.

25. The color temperature compensation method according to claim 18, further comprising:

measuring an ambient color temperature of an ambient light to be the reference color temperature.

* * * * *